(No Model.) 2 Sheets—Sheet 1.

J. J. ROYLE.
APPARATUS FOR SUPPLYING WATER TO WASH BASINS.

No. 460,888. Patented Oct. 6, 1891.

WITNESSES.
Dennis Sumby
Robert Everett

INVENTOR.
John James Royle.
BY HIS ATTORNEY James L. Norris.

(No Model.) 2 Sheets—Sheet 2.

J. J. ROYLE.
APPARATUS FOR SUPPLYING WATER TO WASH BASINS.

No. 460,888. Patented Oct. 6, 1891.

WITNESSES.
Dennis Sumby
Robert Everett

INVENTOR.
John James Royle.
BY HIS ATTORNEY James L. Norris.

UNITED STATES PATENT OFFICE.

JOHN JAMES ROYLE, OF MANCHESTER, ENGLAND.

APPARATUS FOR SUPPLYING WATER TO WASH-BASINS.

SPECIFICATION forming part of Letters Patent No. 460,888, dated October 6, 1891.

Application filed August 19, 1890. Serial No. 362,426. (No model.) Patented in England June 11, 1889, No. 9,613, and July 17, 1890, No. 11,153; in France March 5, 1890, No. 204,178, and in Belgium March 6, 1890, No. 89,747.

*To all whom it may concern:*

Be it known that I, JOHN JAMES ROYLE, a subject of the Queen of Great Britain, residing at Manchester, in the county of Lancaster, England, have invented certain new and useful Improvements in Apparatus for Supplying Water to Wash-Basins, (for which I have obtained Letters Patent in Great Britain and Ireland, No. 9,613, dated June 11, 1889, and No. 11,153, dated July 17, 1890; in France, No. 204,178, dated March 5, 1890, and in Belgium, No. 89,747, dated March 6, 1890,) of which the following is a full, clear, and exact specification.

This invention has for its object to provide a novel, efficient, and useful apparatus for supplying water to wash-basins without the necessity of lifting the pitcher or ewer.

The invention consists in the combination of a pitcher provided with a handle and having journals near the periphery, a framework supporting the pitcher and composed of end frames provided with bearings for the journals, and a rod connecting the end frames and forming a rest for the pitcher when in its normal position.

The invention is illustrated by the accompanying drawings, in which—

Figure 4:
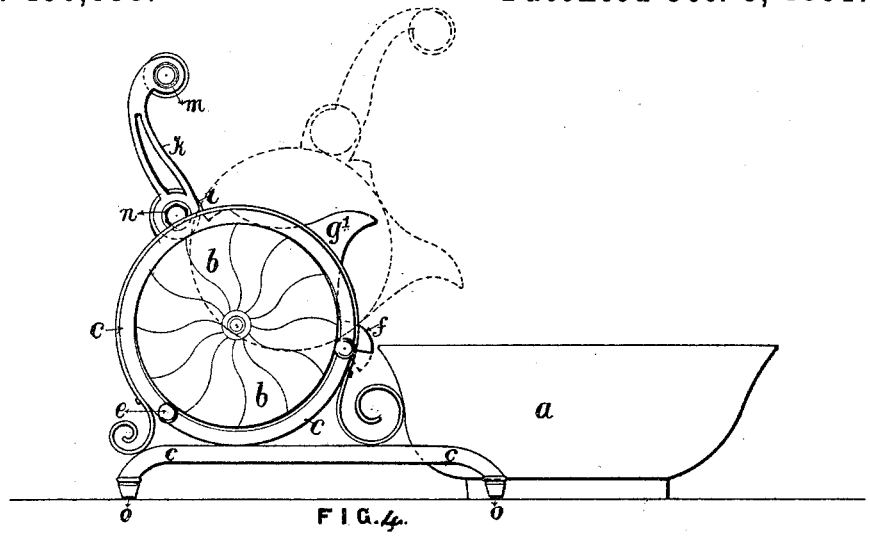
Figure 1:
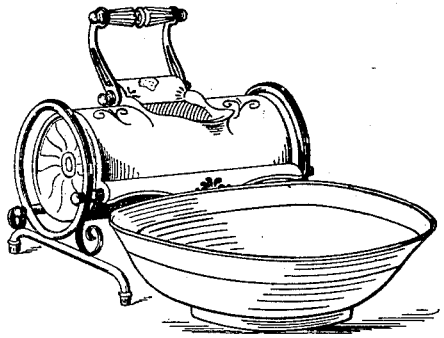
Figure 5:
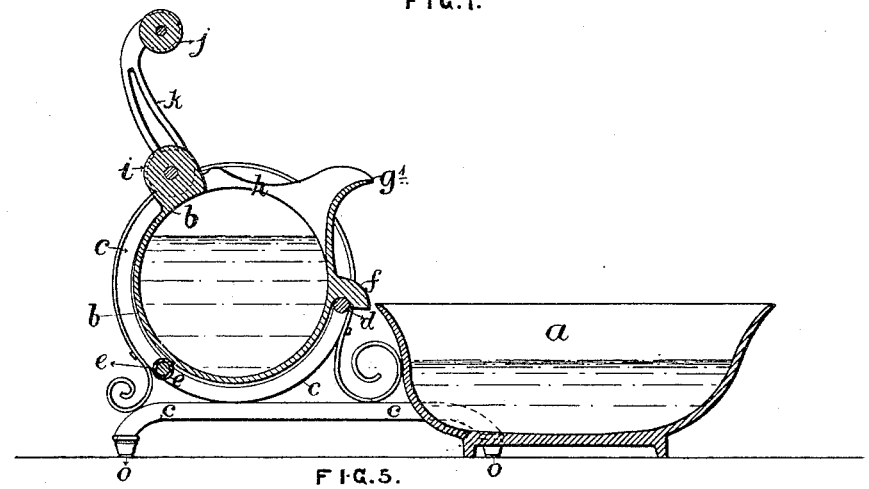
Figure 2:
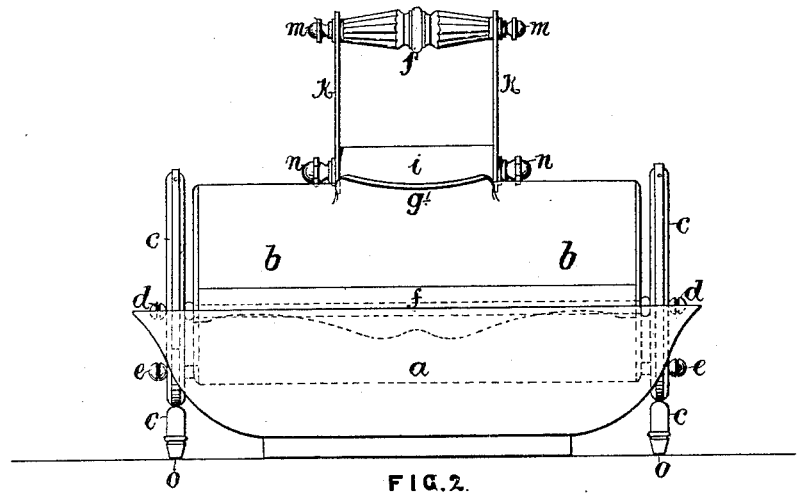
Figure 3:
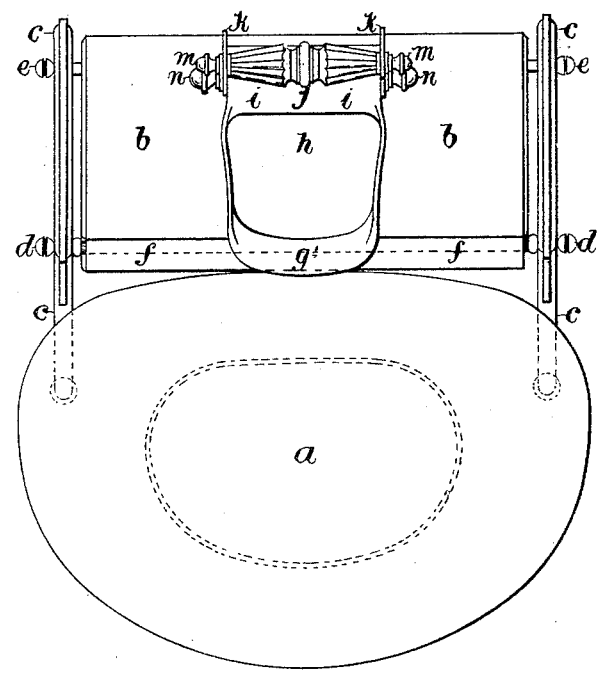

Figure 1 is a perspective view of an apparatus constructed in accordance with my invention. Fig. 2 is a front elevation of the same. Fig. 3 is a top plan view. Fig. 4 is an end elevation, and Fig. 5 is a transverse sectional view.

In order to enable those skilled in the art to make and use my invention, I will now describe the same in detail, referring to the drawings, wherein—

The letter $a$ indicates a wash-basin, which may be of any construction suitable for the conditions required, and $b$ indicates the cylindrical pitcher or water-containing vessel provided at or near its center with a mouth or orifice $h$ and a discharge-spout $g'$, located at the front side of the pitcher or vessel. From the rear portion of the mouth or orifice rises a boss or projection $i$, having arms or standards $k$, connected by a handle-bar $j$, which may be secured to the arms or standards by nuts or caps $m$. The arms or standards $k$ may be secured to the boss or projection $i$ through the medium of nuts or other fastening devices $n$.

The support for the pitcher or water-containing vessel is composed of two end frames $c$, having suitable legs, which are preferably provided with feet having india-rubber or other suitable pads $o$ for the purpose of preventing the frames from sliding upon the polished surface of a wash-stand or table. The end frames are provided with journal-bearings composed of a horizontal rod $d$, suitably secured at its ends to the frames and sustaining the journals of the pitcher or vessel $b$. The journals of the pitcher or vessel are composed of a longitudinal claw or hooked projection $f$, extending along the front side of the pitcher or vessel and resting on the rod $d$. By this arrangement the journals are located near the periphery of the pitcher or vessel, and consequently the preponderance of weight is placed in rear of the center of rotation of the pitcher or vessel, whereby the tendency of the latter is to assume its normal position of rest, as represented in Figs. 1, 4, and 5.

In order to sustain the pitcher in its normal position, I provide a horizontal rod $e$, having its ends connected with the rear portions of the end frames $c$, so that this rod constitutes a back rest for the pitcher or vessel. The rest-rod $e$ is preferably covered with india-rubber or similar material to form a cushion for the purpose of avoiding injury to the pitcher or vessel and also deadening sound.

The end frames which constitute the support for the pitcher or water-containing vessel may be variously constructed and permit of a wide variation in design, as well as in material, so that an ornamental structure can be produced.

In practice the basin and pitcher or water-containing vessel are preferably composed of earthenware; but I do not confine myself to a particular material, as any substance can be employed for this purpose.

In using the improved toilet apparatus the handle-bar $j$ is grasped and drawn forward, thereby turning the pitcher or water-containing vessel on its eccentrically-arranged journal-bearings and causing the water to flow from the discharge-spout $g'$. By this means the inconvenience of lifting the heavy pitcher or ewer is entirely avoided. The pitcher or water-containing vessel has a normal position in rear of the wash-basin, and, owing to its eccentric mounting, the preponderance of weight always remains in rear of the center of rotation, thereby giving the pitcher or water-containing vessel a sense of security and convenience in handling, while its tendency is always to return to its normal position.

Having thus described my invention, what I claim is—

The combination of a pitcher or water-containing vessel provided with a handle and having journals near its periphery, a frame-work supporting the pitcher or vessel and composed of end frames having bearings for the journals, and a rod connecting the end frames and forming a rest for the pitcher when in its normal position, substantially as described.

In testimony whereof I affix my signature to the foregoing specification.

JOHN JAMES ROYLE.

Witnesses:
JOHN G. WILSON,
EDMUND WILSON.